Patented July 4, 1944

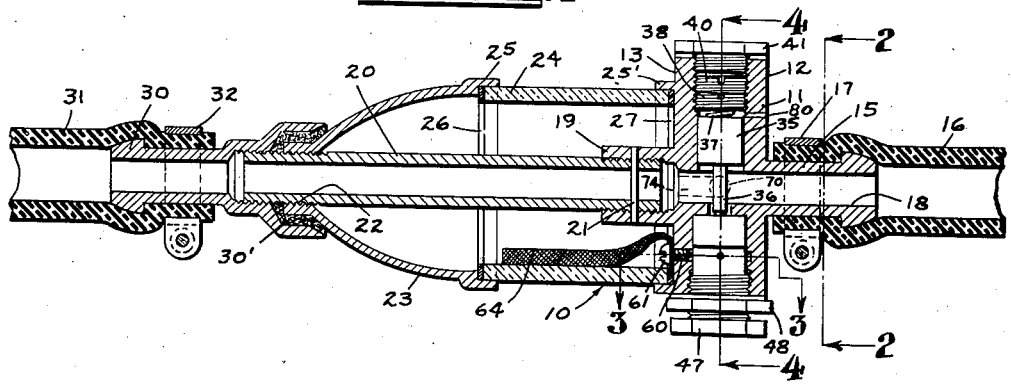

2,352,826

UNITED STATES PATENT OFFICE 2,352,826

PNEUMATIC TOOL LUBRICATOR

Edgar L. Finch, Glendale, Calif., assignor to B. F. B. Engineers, Incorporated, a corporation of California Application June 2, 1943, Serial No. 489,376

6 Claims. (Cl. 184—55)

This invention relates to pneumatic tool lubricators.

The general object of the invention is to provide an apparatus for insertion in the compressed air line which supplies a pneumatically operated tool so that the tool will be oiled by lubricant supplied by the apparatus.

A more specific object of the invention is to provide a novel sight feed lubricator for insertion in pneumatic supply lines.

A more specific object of the invention is to provide a lubricator having novel control means.

A further object of the invention is to provide a novel lubricator valve member.

Other objects and the advantages of my invention will be apparent from the following description taken in connection with the accompanying drawing, wherein:

Fig. 1 is a central sectional view through a lubricator embodying the features of my invention;

Fig. 2 is a section taken on line 2—2, Fig. 1;

Fig. 3 is a fragmentary section taken on line 3—3, Fig. 1, and

Fig. 4 is a section taken on line 4—4, Fig. 1.

Referring to the drawing by reference characters I have shown my invention as embodied in a lubricator which is indicated generally at 10. As shown the lubricator includes a body 11 shown as having ends 12 and 13 and having a generally circular periphery 14. At the end 11 of the body I provide a coupling member 15 to which a hose 16 is secured by a clamp 17.

The coupling member 15 and body 11 have a coaxial bore 18. From the end 13 an internally threaded collar 19 projects. The interior of this collar is of greater diameter than the bore 18 and threadedly engages a tube 20 which is shown as held in place by a pin 21.

The outer end of the tube 20 is threaded as at 22 and receives an end member 23. One end of the end member 23 engages one end of a transparent sight glass 24. The other end of the sight glass engages the end 13 of the body 11. A collar 25 on the end member 23 and a second collar 25' on the end 13 hold the sight tube 24 in place and a leak-tight joint is provided by gaskets 26 and 27 which engage the ends of the sight tube. The extreme outer end of the tube 20 threadedly engages a coupling member 30 which is connected to a hose 31 by a clamp 32. A gasket 30' is arranged between the coupling member and the tube 20 and the end member 23.

The body end member and sight tube provide a housing or reservoir and the tube 20 and end member provide a conduit.

The body 11 includes a pair of aligned opposed outwardly opening bores 33 and 34, both bores 33 and 34 communicating with the bore 18. The bore 33 is of slightly less diameter than the bore 34. The bore 33 receives a sliding cup or piston member 35 on which a valve 36 is mounted. A spring 37 normally urges the piston and valve 36 inwardly. The spring 37 is engaged by a nut 38 threaded into an enlarged outer portion 39 of the bore 33. A second nut 40 serves as a lock nut to hold the nut 38 in place and a closure cap 41 engages a gasket 42 to complete the seal.

The valve 36 has a conical lower end 43 which engages a frusto-conical valve seat 44 on a valve member 45 which is arranged in the bore 34 and is held in place by a plug member 46 which has a head 47 thereon. A lock nut 48 serves to hold the plug member 46 in place. A gasket 49 is arranged to be engaged by the lock nut 48.

The valve member 45 is hollow and has a hole 50 in the outer end through which compressed felt 51 or other similar material is inserted. The lubricating material passes through this felt 51 and the nature of the felt and its degree of compression in a measure determine the rate of flow therethrough. The valve member 45 is removable so that it may be changed or repaired as desired. By changing the valve member and substituting another with a proper felt therein I make provision for controlling flow of oil of different viscosities.

The inner end of the plug member 46 has a recess 52 from which a plurality of apertures 53 extend through the side wall thereof. These apertures 53 are aligned with a groove 54 in the wall of the bore 34 and the construction is such that lubricant in the groove 54 may pass through the apertures 53 and into the chamber 52.

The body is provided with a threaded aperture 60 which extends from the bore 34 and opens into the sight tube 24. This threaded aperture receives a screw 61. This screw is arranged in aperture 63 in a wick member 64 which extends into the sight tube 24 and is moistened by lubricant in the sight tube. The threaded aperture 60 is intersected by spaced slots 65 and 66 which extend through the wall of the body 11 and form passages through which oil from the wick 64 may pass to the groove 54.

The body 11 is provided with a hole 70, the outer end of which is threaded at 71 and closed by a plug 72. A gasket 73 is engaged by the plug 72. The hole 70 communicates with a longitudinal hole 74 which extends through the end 13 and communicates with the interior of the lubricator.

To fill the lubricator the cap 72 is removed and lubricant poured through the hole 70 whence it passes through the hole 74 to the interior of the lubricator.

When the lubricator is in operative position and the hoses 16 and 31 are connected to a source of compressed air and a pneumatic tool respectively air passes through the two hoses and through the lubricator. Tools of this nature are intermittently operated and as a result air pressure is built up and released frequently while the tool is in use. When the tool is not in use the air pressure builds up in the lubricator.

When the tool is operated the pressure in the lubricator drops slightly so that a reduced pressure is produced near the valve seat 43 thus drawing some of the oil within the lubricator through the wick 74 into the channel 65 and thence to the groove 54 and through the aperture 53 into the chamber 52 whence it passes through the hole 50, through the compressed felt 51 and through the valve seat 43 so that the oil mingles with the compressed air passing to the tool and thus a very small amount of oil goes to the working parts of the tool. Thus repeatedly small quantities of oil are directed to the tool so that the latter is lubricated.

The valve 36 opens as soon as air under pressure enters the lubricator and thus the valve remains open when the tool is working and is at rest. By adjusting the spring 37 the amount the valve opens may be regulated.

The body 11 is provided with a hole 80 so that the area immediately above the piston 35 will be vented to the atmosphere.

From the foregoing description it will be apparent that I have invented a novel pneumatic tool lubricator which can be economically manufactured and which is highly efficient for its intended purpose.

Having thus described my invention, I claim:

1. In a lubricator, a hollow housing member having a conduit extending therethrough, said housing including a portion spaced from the conduit to form a reservoir, said conduit being adapted to be coupled to a hose, said housing having a pair of aligned bores communicating with the conduit, a valve mounted in one of said bores, a valve seat member in the other bore, said valve serving to control passage of oil from the other bore to the conduit, means normally urging said valve to closed position, means subject to fluid pressure in the conduit for opening the valve, said valve seat member including an oil pervious material arranged in the path of oil flowing from the reservoir to the valve, said housing having a passageway from the reservoir to the other bore and a wick member associated with the passageway and in the path of oil flowing from the reservoir to the valve.

2. In a lubricator, a hollow housing member having a conduit extending therethrough, said housing including a portion spaced from the conduit to form a reservoir, said conduit being adapted to be coupled to a hose, said housing having a pair of bores communicating with the conduit, a valve slidable in one of said bores, a valve seat member mounted in the other bore, said valve seat member having a valve seat engageable by said valve, a spring normally urging said valve to closed position, an oil pervious material arranged in the path of oil flowing from the reservoir to the valve, said housing having a passageway from the reservoir to the other bore.

3. In a lubricator, a hollow housing member having a conduit extending therethrough, said housing including a portion spaced from the conduit to form a reservoir, said housing including a transparent portion, said conduit being adapted to be coupled to a hose, said housing having a pair of bores communicating with the conduit, a valve slidable in one of said bores, a valve seat member mounted in the other bore, said valve seat member having a valve seat engageable by said valve, a spring normally urging said valve to closed position, said valve seat member being hollow and having an oil pervious material arranged therein in the path of oil flowing from the reservoir to the valve, said housing having a passageway from the reservoir to the other bore and a wick member in the path of oil flowing from the reservoir to the valve.

4. In a pneumatic tool lubricator, a hollow housing member having a conduit extending therethrough, said housing including a portion spaced from the conduit to form a reservoir, said conduit being adapted to be coupled to a hose, said housing having a pair of bores communicating with the conduit, a valve slidable in one of said bores, a valve seat member mounted in the inner end of the other bore, and an oil pervious material in the path of oil flowing from the reservoir to the valve, a plug in the outer end portion of the second bore, said plug having a recess in the end thereof and having an aperture passing through the wall of the recessed portion, said other bore having a groove in the wall thereof aligned with said aperture, said housing having a slot extending through the wall thereof and intersecting the groove and forming a passage for oil flowing from the reservoir to the valve.

5. In a pneumatic tool lubricator, a body having an axial bore therethrough, a coupling member communicating with said bore, a tube communicating with said bore, means forming a reservoir about the tube, a second coupling member communicating with said tube, said body having a pair of transverse outwardly opening bores communicating with the axial bore, a valve slidable in one of said transverse bores, a hollow valve seat member mounted in the other transverse bore, and an oil pervious material in said valve seat member in the path of oil flowing from the reservoir to the valve, a plug member in said other transverse bore having a recess in the end thereof and having an aperture passing through the wall of the recessed portion, said other transverse bore having a groove in the wall thereof aligned with said aperture, said valve seat member having a hole communicating with said oil pervious material, said body having a slot extending through the wall thereof and intersecting said groove and forming a passage for oil flowing from the reservoir to the valve.

6. In a pneumatic tool lubricator, a body having an axial bore therethrough, a coupling member communicating with said bore, a tube communicating with said bore, means forming a reservoir about the tube, a coupling member engaging said tube, said body having a pair of transverse outwardly opening bores communicating with the axial bore, a valve slidable in one of said transverse bores, a hollow valve seat member in the other transverse bore, oil pervious material in said valve seat member, a plug in said other transverse bore and engaging said valve seat member to hold the valve seat member in place, said plug having a recess in the end thereof and having aligned apertures passing through the wall of the recessed portion, said other transverse bore having a groove in the wall thereof aligned with said apertures, said valve seat member having a hole communicating with said recess and said oil pervious material, said body having a threaded aperture extending from the other transverse bore and opening into the reservoir, a screw in said aperture, and a wick member engaged by said screw, said body having a slot intersecting the threads of said last mentioned aperture and extending through the wall of the body and intersecting said groove, said slot being open when the screw is in place to form a passage for oil flowing from the reservoir to the valve.

EDGAR L. FINCH.